April 26, 1960     G. DE MESTRAL     2,933,797
CUTTING DEVICE FOR PILE FABRICS
Filed April 29, 1957
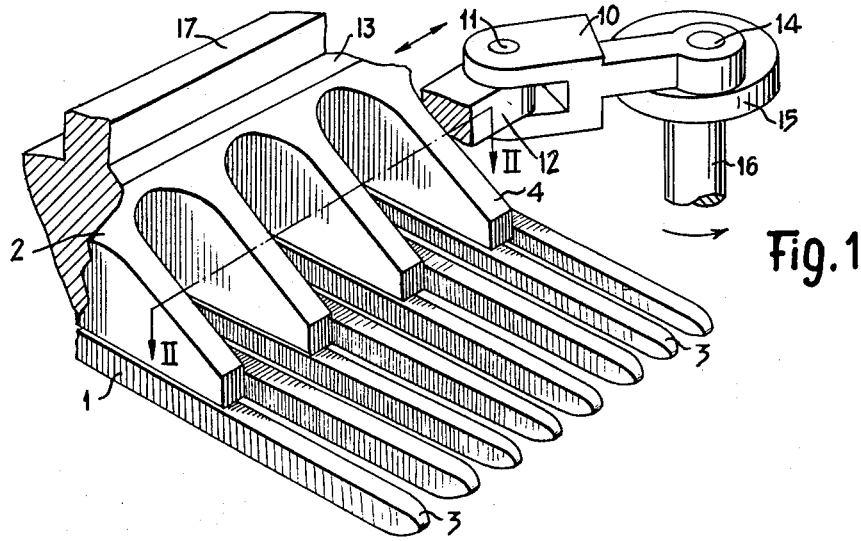
Fig.1
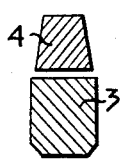
Fig.2
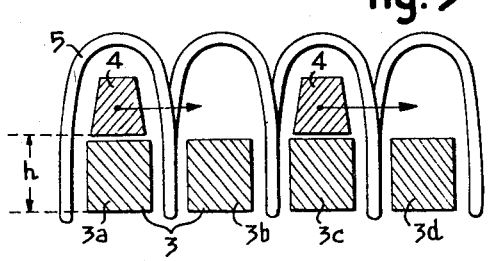
Fig.3
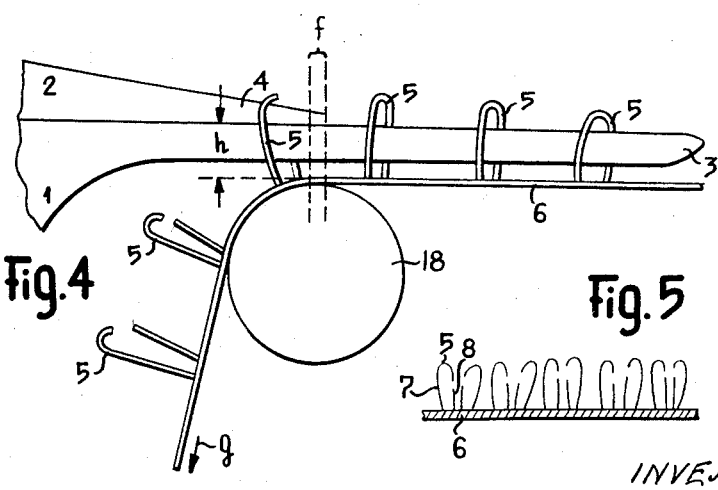
Fig.4
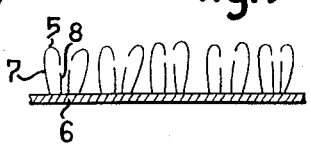
Fig.5
INVENTOR
GEORGE de MESTRAL
By

United States Patent Office 2,933,797
Patented Apr. 26, 1960

2,933,797

CUTTING DEVICE FOR PILE FABRICS

George de Mestral, Vich, Switzerland, assignor to Sines Sociedad Para Inversiones Extranjeras S.A., a corporation of Panama Application April 29, 1957, Serial No. 655,888

Claims priority, application Switzerland May 16, 1956

2 Claims. (Cl. 26—9)

The present invention has for its subject a cutting device of the type comprising two cutters in the form of a comb, of which at least one is capable of being driven in an alternating movement relatively to the other so as to obtain a cutting action between the corresponding teeth of the two cutters.

This cutting device is thus of the same type as the usual shears. The cutting device according to the invention is characterised in that one of the cutters, called the "movable" cutter, is provided, for the same width, with half the number of teeth as the other cutter referred to as the "stationary" cutter, the "movable" cutter being driven in a to-and-fro movement in a direction perpendicular to the axes of the teeth, by an amplitude substantially equal to the spacing between the axes of two adjacent teeth of the "stationary" cutter, each tooth of the "movable" cutter sweeping only over the space occupied by a pair of adjacent teeth of the "stationary" cutter and the corresponding intermediate teeth-spacing, so that solely the piles of the fabric engaged between the teeth are cut.

A cutting device of this character is adapted to be used, particularly, for cutting rows of loops of a fabric of the terry fabric type or uncut velvet type. The cutting device is more particularly adapted for the production of hooking devices of the type described in U.S. Patent No. 2,717,437. The hooking device described in this specification comprises two layers of fabric covered with pile of the velvet type, one part at least of this pile being curved at its end so as to form hooks.

One form of construction of the cutting device according to the invention is shown diagrammatically and by way of example in the accompanying drawing, wherein:

Fig. 1 is a perspective view of the device.

Fig. 2 is a partial section on the line II—II of Fig. 1.

Figs. 3 and 4 show the manner in which the cutting device according to the invention operates.

Fig. 5 shows a section of a fabric of the velvet type, of which a portion of the pile constitutes hooks.

The cutting device described with reference to Figs. 1 to 4, comprises two cutters 1 and 2 in the form of a comb. The cutter 1, hereinafter referred to as the "stationary" cutter, has twice as many teeth as the cutter 2, hereinafter referred to as the "movable" cutter. In the example shown, the "stationary" cutter is illustrated by a comb with eight teeth 3, whilst the "movable" cutter 2 has only four teeth 4 for the same width of operation.

The "movable" cutter 2 is adapted to be driven in an alternating to-and-fro movement in a direction perpendicular to the axes of the teeth by any known type of mechanism. Such a mechanism for driving the movable cutter 2 in an alternating to-and-fro movement is well known in the art and is shown schematically in Figure 1. This means or mechanism comprises connecting rod 10 hinged at 11 at the end of extension 12 of support 13 carrying the movable cutter 2. The other end of connecting rod 10 is eccentrically hinged on handle 14 of crank 15 carried by the rotatably driven motor shaft 16. Also, support 13 carries a guiding rib 17 for sliding in a groove, not shown, forming part of the apparatus. This guiding rib 17 is for assuring perfect transverse movement of cutter 2 while the crank 15 is rotatably driven and causes the connecting rod 10 to move alternately to-and-fro. The amplitude of this to-and-fro movement is selected substantially equal to the spacing between the axes of two adjacent teeth 3 of the "stationary" cutter 1. Thus, each tooth 4 of the "movable" cutter only moves opposite the same pair of adjacent teeth 3 of the "stationary" cutter 1. For this reason only the fibres, or filaments, of any type located between the two teeth 3 of the same pair, are cut by the corresponding tooth 4 of the "movable" cutter 2.

In the case in which the cut is adapted to be used for forming hooks on the rows of loops of a fabric of the terry fabric type or uncut velvet type, a cutter comb is constructed of which the spacing of the teeth 3 of the "stationary" cutter 1 is substantially equal to the spacing of the rows of loops of the fabric, so that the cutting device can be engaged simultaneously in a number of rows of loops (see Fig. 3).

The loops 5 of a same row of the fabric advance progressively over the corresponding tooth 3 of the lower cutter 1 by means of roller 18. When these loops 5 enter the zone $f$, shown in Fig. 4, only one of the limbs of the loops 5 is then cut by the corresponding tooth 4 of the upper cutter 2 at the heighth indicated in Figs. 3 and 4. In fact, the lateral movement of the cutter 2 relatively to the cutter 1 produces the cutting of only one of the limbs of the loops 5, namely the limb engaged between the teeth 3 of the same pair. When the loops have been cut, they are entrained by the fabric in the direction $g$ so as to escape from the cutting device.

It will be understood that all the loops 5 which follow one another on the same tooth $3a$, for example, are cut on their right-hand limb (Fig. 3), whilst all the loops echeloned on the tooth $3b$, for example, are cut on the left limb of the loop, thus enabling a hook to be obtained at the left and a hook at the right.

The same operation is repeated between the teeth $3c$ and $3d$ as the tooth 4 corresponding to this pair of teeth $3c$, $3d$ carries out a to-and-fro movement identical with that of the tooth 4 corresponding with the pair of teeth $3a$, $3b$.

After the cutting operation, the terry fabric formed by a base 6, carrying the loops 5, shows these cut at an intermediate height and only on one side thereof (see Fig. 5). All the loops 5 have then been formed into hooks having the appearance of loops. The element 7 of each loop 5 forms the hook proper, whilst the element 8 constitutes ordinary dressed pile.

The cutting device above described (with reference to the accompanying drawing) constitutes to some extent a differential shearing machine.

It is to be observed that the cutting device hereinbefore described with reference to the drawing, is more particularly advantageous for allowing of cutting at the side the loops of a fabric of the terry fabric type or uncut velvet type forming part of the hooking device described in U.S. Patent No. 2,717,437. In fact, said cutting device permits of carrying out this operation in an economic and continuous manner without any appreciable difficulty, in view of the fact that the teeth 3 of the "stationary" cutter 1 are themselves guided under the arches formed by the loops to be cut.

In the form of construction above described by way of example with reference to the accompanying drawing, the "movable" cutter 2 was placed above the "stationary" cutter 1. However it is obvious that the respective position of these cutters 1 and 2 may be inverted, the "movable" cutter 2 being disposed under the "stationary" cutter 1.

Likewise the size and form given to the teeth 3 and 4 may be chosen in every particular case according to the sort of fabric, terry fabric or uncut velvet, which must be worked by the cutting device.

I claim:

1. Apparatus for cutting loops of a pile fabric aligned in adjacent, substantially parallel rows on one of their legs only to form hooks, comprising, in combination, a movable blade, a stationary blade, said blades being juxtapositioned with respect to each other, said movable blade having a plurality of spaced apart teeth, said stationary blade having a plurality of spaced apart teeth, said teeth of said movable blade being one half the number of teeth of said stationary blade and being arranged in vertical axial alignment with alternate teeth of said stationary teeth at the respective rear portions of said stationary teeth, means for driving the movable blade perpendicularly to the axes of the teeth in an alternating to-and-fro movement having an amplitude substantially equal to the spacing between the axes of each two adjacent teeth of said stationary blade, each of said spaced apart teeth of said stationary blade including means extending forwardly of said teeth of said movable blade for receiving thereover and thereabout the loops of one row of said parallel rows of loops, said means constituting the front portion of each of said teeth of said stationary blade, and means for moving said loops in each parallel row of loops of said fabric over and about the front portions of the respective teeth of said stationary blade towards and against the respective teeth of said movable blade and then perpendicularly to the axes of and away from said teeth of said stationary blade, whereby a unidirectional shearing action is effected to sever alternate, adjacent legs of adjoining loops leaving the other leg of each loop in the shape of a hook.

2. Apparatus for cutting loops of a pile fabric aligned in adjacent, substantially parallel rows on one of their legs only to form hooks, comprising, in combination, a movable blade, a stationary blade, said blades being juxtapositioned with respect to each other, said movable blade having a plurality of spaced apart teeth, said stationary blade having a plurality of spaced apart teeth, said teeth of said movable blade being one half the number of teeth of said stationary blade and being arranged in vertical axial alignment with alternate teeth of said stationary teeth at the respective rear portions of said stationary teeth, each of said spaced apart teeth of said stationary blade including a front portion extending forwardly of said teeth of said movable blade, and means for moving said loops in each parallel row of loops of said fabric over and about the respective front portion of each of the spaced apart teeth of said stationary blade and against the respective teeth of said movable blade and then away from the stationary blade, whereby a unidirectional shearing action is effected to sever alternate, adjacent legs of adjoining loops leaving the other leg of each loop in the shape of a hook.

References Cited in the file of this patent

UNITED STATES PATENTS

| 946,904 | Levray | Jan. 18, 1910 |
| 1,939,253 | Dremel | Dec. 12, 1933 |
| 2,332,557 | Carillo et al. | Oct. 26, 1943 |
| 2,717,437 | Mestral | Sept. 13, 1955 |

FOREIGN PATENTS

| 643,596 | Germany | Apr. 12, 1937 |